(12) United States Patent
Wilson

(10) Patent No.: US 9,740,364 B2
(45) Date of Patent: Aug. 22, 2017

(54) COMPUTER WITH GRAPHICAL USER INTERFACE FOR INTERACTION

(75) Inventor: Andrew D. Wilson, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 844 days.

(21) Appl. No.: 12/772,864

(22) Filed: May 3, 2010

(65) Prior Publication Data

US 2011/0271216 A1 Nov. 3, 2011

(51) Int. Cl.
*G06F 3/033* (2013.01)
*G06F 3/0481* (2013.01)
*G06F 3/0485* (2013.01)
*G06F 3/0488* (2013.01)

(52) U.S. Cl.
CPC ........ *G06F 3/04812* (2013.01); *G06F 3/0481* (2013.01); *G06F 3/0488* (2013.01); *G06F 3/04855* (2013.01); *G06F 2203/04808* (2013.01)

(58) Field of Classification Search
CPC .. G03G 15/502; G03G 15/5016; G03G 15/55; G03G 15/6552; G03G 2215/00421
USPC ........................................................ 715/863
See application file for complete search history.

(56) References Cited

U.S. PATENT DOCUMENTS

| | | | |
|---|---|---|---|
| 7,487,467 B1* | 2/2009 | Kawahara et al. ........... 715/810 | |
| 7,489,306 B2* | 2/2009 | Kolmykov-Zotov et al. ............... 345/173 | |
| 7,643,011 B2 | 1/2010 | O'Connor et al. | |
| 7,777,728 B2* | 8/2010 | Rainisto ......................... 345/173 | |
| 2006/0001652 A1* | 1/2006 | Chiu et al. ..................... 345/173 | |
| 2007/0226636 A1* | 9/2007 | Carpenter et al. ............ 715/751 | |
| 2008/0040692 A1* | 2/2008 | Sunday ............... G06F 3/04883 715/863 | |
| 2008/0189657 A1* | 8/2008 | Kim ..................... G06F 3/0485 715/810 | |
| 2009/0132937 A1* | 5/2009 | Allen et al. ................... 715/762 | |
| 2009/0251411 A1* | 10/2009 | Chen ............................. 345/158 | |
| 2009/0278799 A1 | 11/2009 | Wilson | |

(Continued)

OTHER PUBLICATIONS

ShapeTouch: Leveraging Contact Shape on Interactive Surfaces; Cao et al.; 2008 IEEE International Workshop on Horizontal Interactive Human Computer System; Jul. 2008; pp. 139-146.

(Continued)

*Primary Examiner* — Di Xiao
(74) *Attorney, Agent, or Firm* — Singh Law, PLLC; Ranjeev Singh

(57) ABSTRACT

Different techniques of processing user interactions with a computing system are described. In one implementation, an interactive display is configured to depict a graphical user interface which includes a plurality of different types of user interface elements (e.g., button-type element, scroll bar-type element). A user may use one or more user input object (e.g., finger, hand, stylus) to simultaneously interact with the interactive display. A plurality of different user input processing methods are used to process user inputs received by the graphical user interface differently and in accordance with the types of the user interface elements which are displayed. The processing of the user inputs is implemented to determine whether the user inputs control the respective user interface elements. The processing may determine whether the user inputs activate and/or manipulate the displayed user interface elements in but one example.

20 Claims, 7 Drawing Sheets

(56) References Cited

U.S. PATENT DOCUMENTS

2010/0259561 A1\* 10/2010 Forutanpour et al. ........ 345/660
2010/0302454 A1\* 12/2010 Epstein .................. H04N 5/268
348/705

OTHER PUBLICATIONS

A Multi-Touch Surface Using Multiple Cameras; Katz et al.; http://wsnl.stanford.edu/papers/acivs07_hand.pdf; Aug. 18, 2007; 12 pp.
TouchLight: An Imaging Touch Screen and Display for Gesture-Based Interaction; Andrew Wilson; http://research.microsoft.com/en-us/um/people/awilson/publications/WilsonICMI2004; Oct. 15, 2004; 8 pp.
Dynamically Reconfigurable Vision-Based User Interfaces; Kjeldsen et al.; http://www.research.ibm.com/people/p/pinhanez/publications/icvs03.pdf; Apr. 3, 2003; 10 pp.
LumiPoint: Multi-User Laser-Based Interaction on Large Tiled Displays; Davis et al.; https://graphics.stanford.edu/papers/multiuser/lumipoint.pdf; Nov. 2002; 12 pp.
Vision-Based Gesture Recognition: A Review; Wu et al.; Proceedings of the International Gesture Workshop on Gesture-Based Communication in Human-Computer Interaction; Jan. 1, 1999; pp. 1-12.
The Bubble Cursor: Enhancing Target Acquisition by Dynamic Resizing of the Cursor's Activation Area; Grossman et al.; CHI 2005, Papers: Smart Interaction Techniques 1; Apr. 2-Jul. 2005; pp. 281-290.

\* cited by examiner

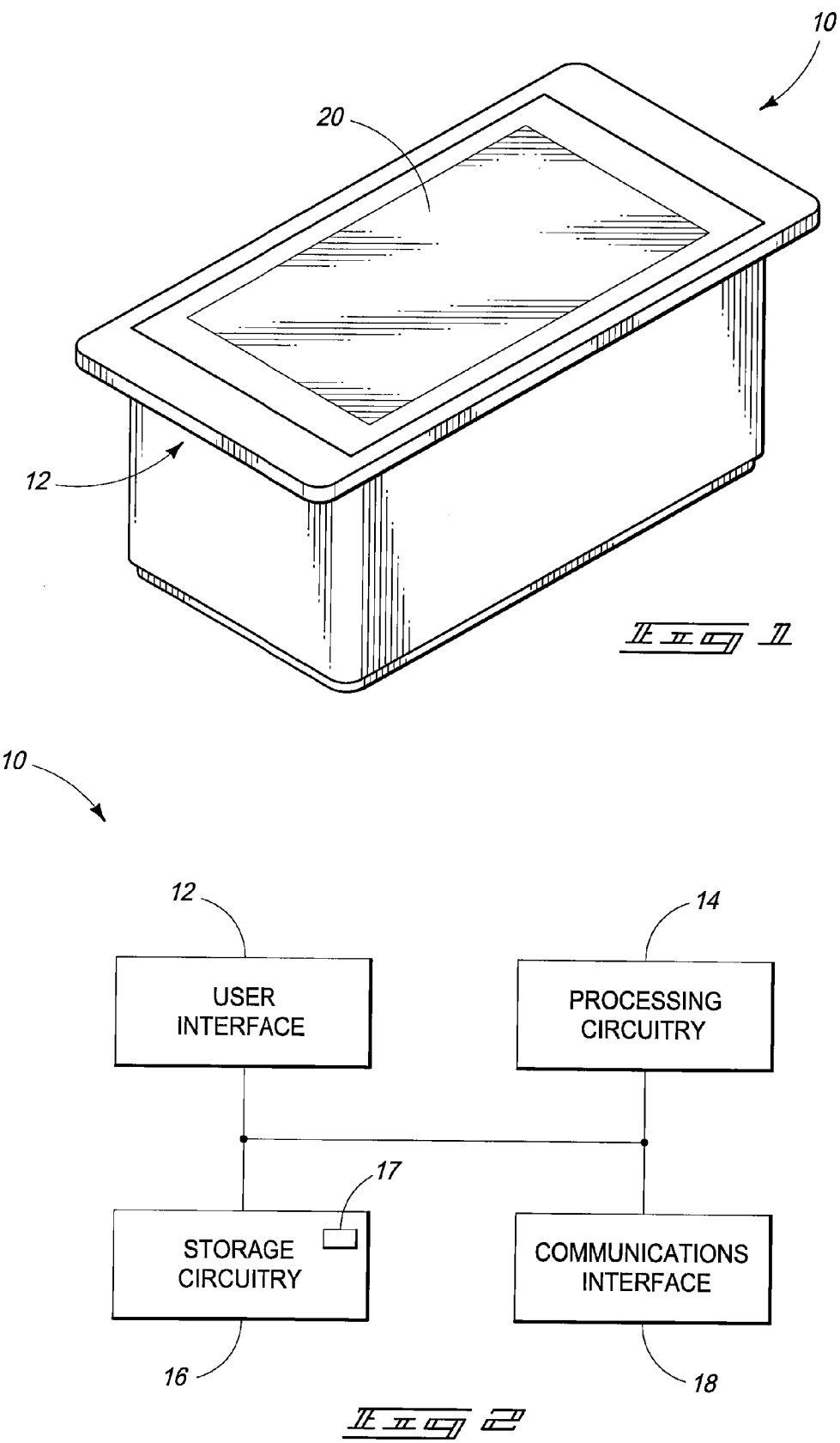

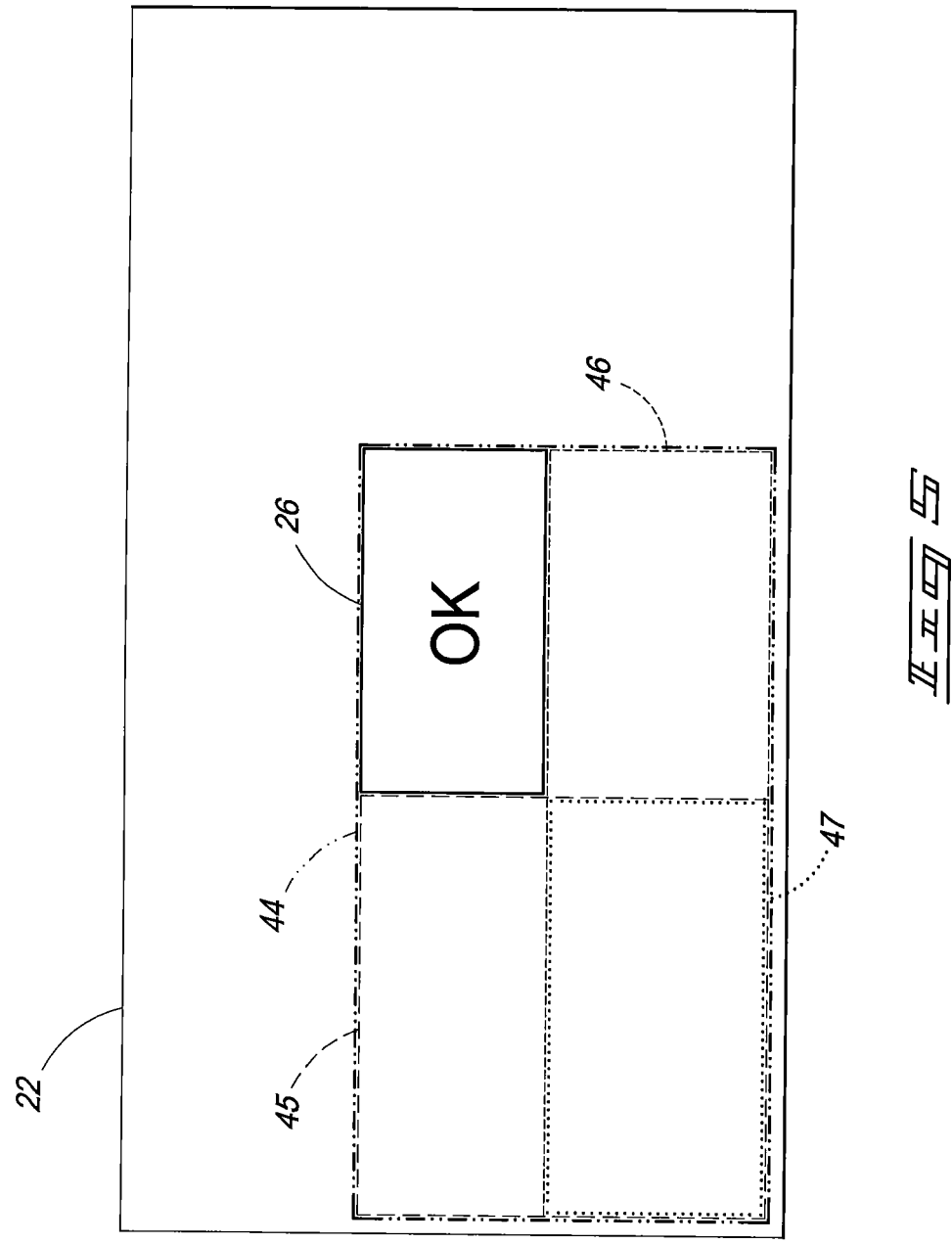

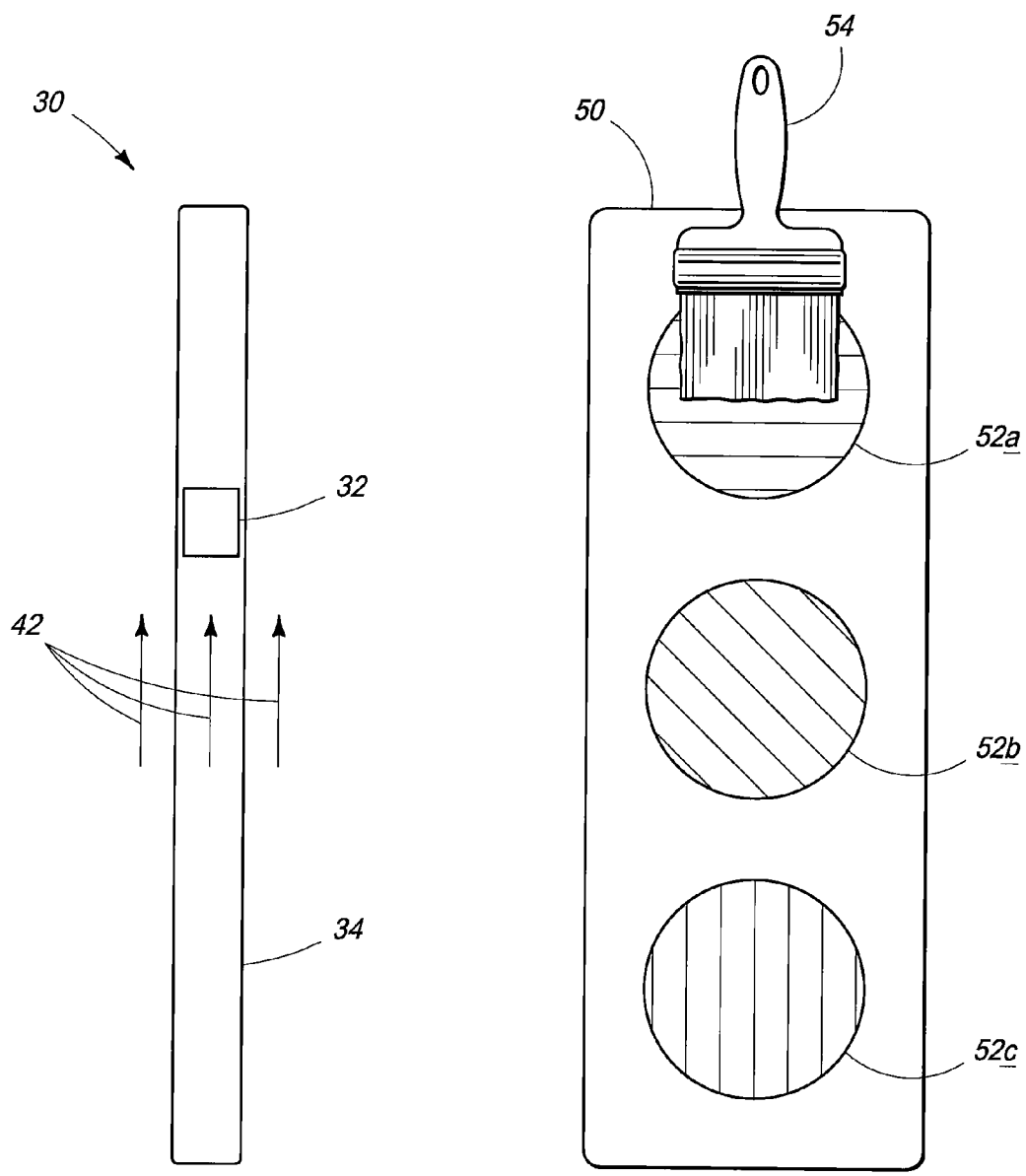

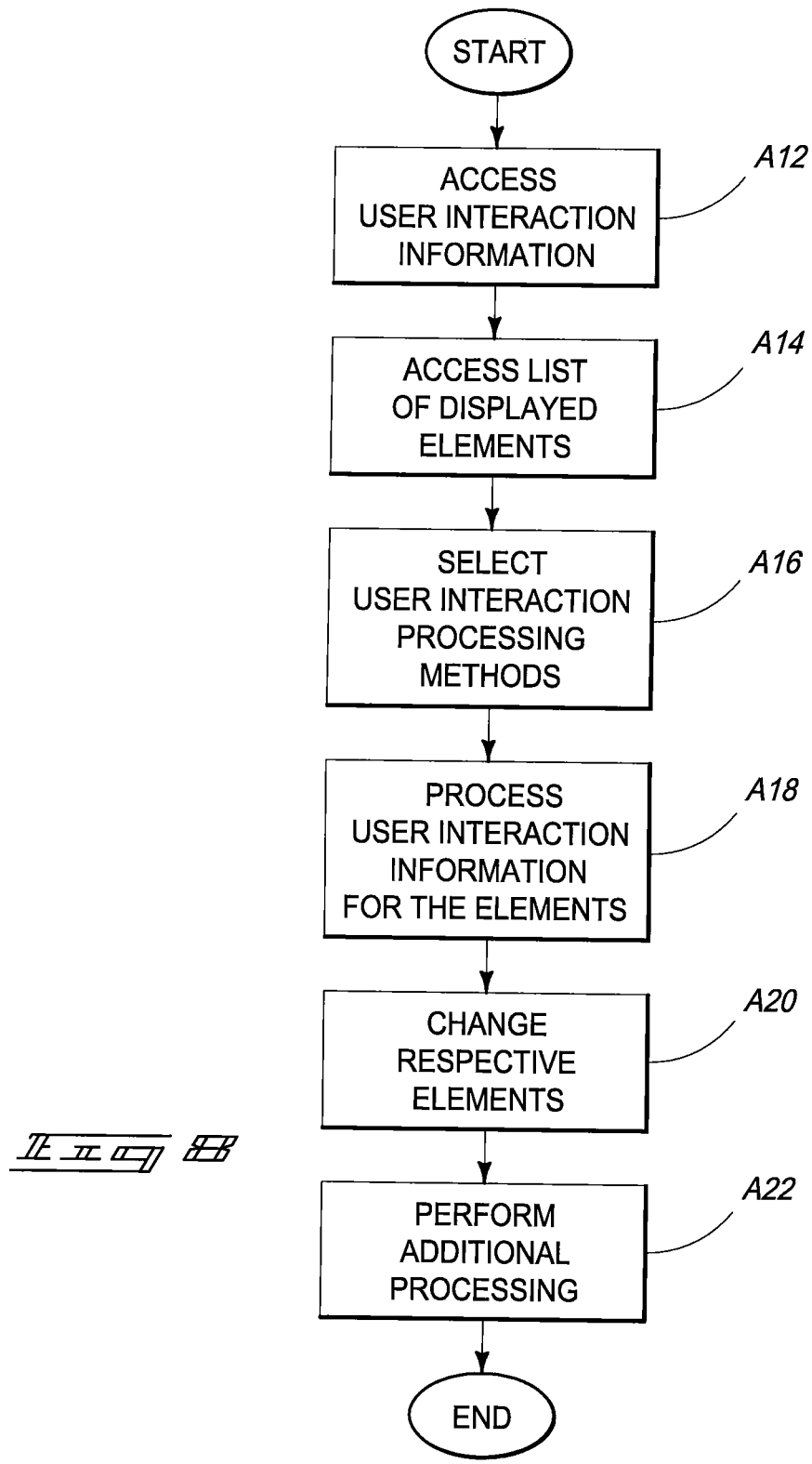

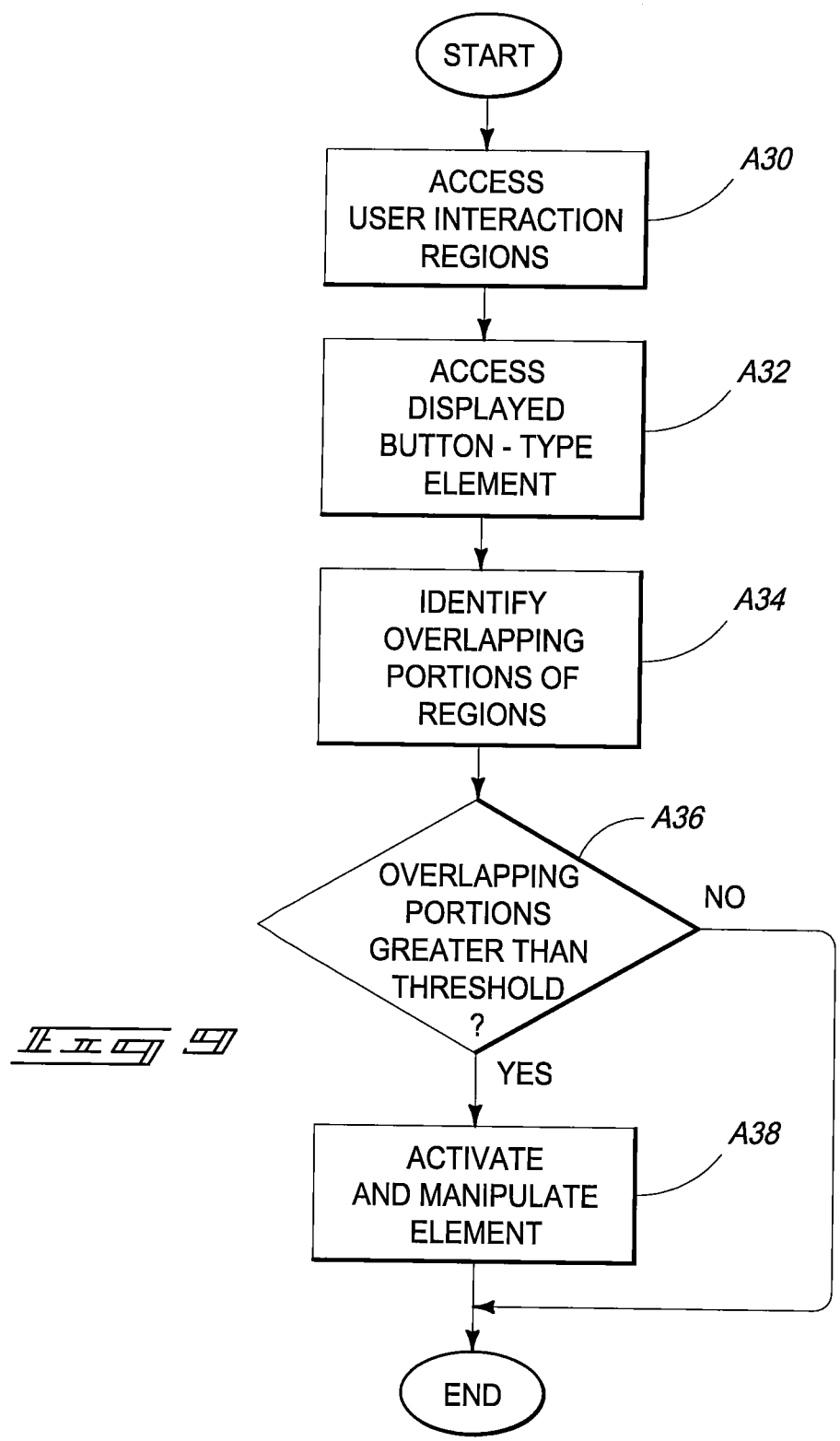

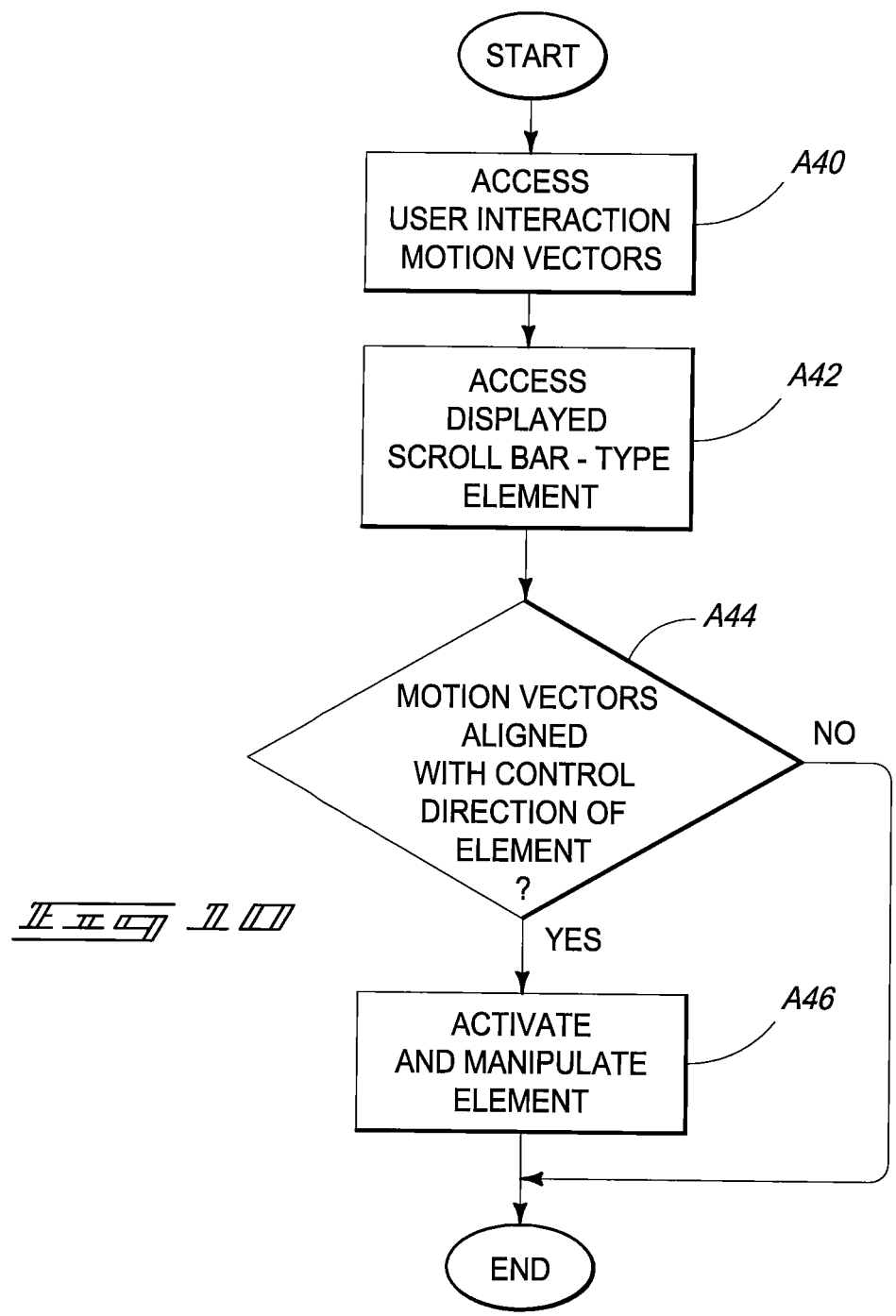

COMPUTER WITH GRAPHICAL USER INTERFACE FOR INTERACTION

BACKGROUND

Computing systems are ubiquitous in business, school and entertainment. The uses and applications of computing systems continue to increase as the capabilities of the systems increase. Furthermore, existing computing systems have expanded capabilities and different types of systems have been more recently introduced as computing technologies continue to improve.

Various types of user interfaces permitting users to interact with computing systems have also evolved. Keyboards have traditionally been used by users to interact with computing systems while graphical user interfaces have also been introduced which permit users to interact with a computing system utilizing a pointing device, such as a mouse. More recently, interface systems have been introduced which respond to a user's touch interacting with a graphical display, and some multi-touch interface systems are configured to process multiple simultaneous inputs.

At least some aspects of the disclosure provide improvements with respect to processing of user interactions with graphical user interfaces.

SUMMARY

Different techniques of processing user interactions with a computing system are described in this disclosure. In one implementation, a graphical user interface is displayed which includes one or more user interface elements which a user may interact with. The displayed user interface elements may be different types of elements (e.g., button, scroll bar) which users interact with in different ways.

In one embodiment, user inputs received by the graphical user interface may be processed differently corresponding to the different types of user interface elements which are displayed. The processing of the user inputs determines whether the user inputs control (e.g., user inputs activate and/or manipulate) displayed user interface elements in one example. In one more specific implementation, a plurality of different user input processing methods are available to be used to process user inputs and the methods are tailored to process the user inputs in different ways corresponding to the different types of user interface elements which are displayed. As mentioned above, users may interact with the different types of elements in different ways (e.g., depress a button-type element or drag a scroll box of a scroll bar-type element) and the processing methods may be configured to process the user inputs in accordance with specific types of user interactions which may be expected to occur if the user intended to interact with the different types of user interface elements. The use of different processing methods enables processing of the user inputs which is tailored to the types of user interface elements being displayed instead of using a single processing method to process user inputs with respect to different types of user interface elements.

In one embodiment, the computing system selects the processing methods which correspond to the different types of interface elements which are displayed, and then uses the selected methods to process the user inputs to determine whether the user inputs activate and/or manipulate the different types of interface elements. For example, if a button-type element is displayed, one of the processing methods which is tailored to process inputs with respect to a button is selected to process user inputs to determine if the user inputs activate and/or manipulate the button-type element. If other types of user interface elements are displayed, other processing methods may be selected and utilized to process the user inputs to determine if the user inputs activate and/or manipulate the other types of displayed user interface elements as described in further detail below. Some specific example techniques for processing user inputs with respect to different user interface elements are described in the disclosure below.

According to one implementation, at least one computer-readable storage medium comprises programming stored thereon that is configured to cause processing circuitry to perform processing operations with respect to a graphical user interface. The programming may cause the processing circuitry to display the graphical user interface which includes first and second different types of user interface elements. User inputs with respect to the graphical user interface are processed differently using first and second different user input processing methods which are tailored to process the user inputs with respect to the first and second different types of user interface elements. The processing of the user inputs using the first and second user input processing methods determines whether the user inputs activate and/or manipulate the first and/or second different types of user interface elements as discussed in detail below according to example embodiments of the detailed description.

In an example embodiment, the computing system analyzes each user input separately (and perhaps differently) with respect to all user interface elements (which can include elements of different types) that are displayed. The processing of the user input for a displayed user interface element determines whether the user input controls that user interface element.

In yet another implementation, a computing system includes processing circuitry and an interactive display configured to display a graphical user interface. The graphical user interface includes one of a plurality of different types of user interface elements. The processing circuitry determines the type of the user interface element which is displayed in the graphical user interface and processes user input received by the graphical user interface in accordance with the type of the displayed user interface element to determine if the user input activates and/or manipulates the displayed user interface element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 is an illustrative representation of a computing system according to one embodiment.

FIG. 2 is a functional block diagram of a computing system according to one embodiment.

FIG. 5 is an illustrative representation of a method of processing user input using a summed area table according to one embodiment.

FIG. 6 is an illustrative representation of motion vectors of user interaction with respect to a scroll bar-type element according to one embodiment.

FIG. 7 is an illustrative representation of interaction of a user's paint brush with respect to the user interface according to one embodiment.

FIG. 8 is a flow chart of a method of processing user inputs with respect to user interface elements according to one embodiment.

FIG. 9 is a flow chart of a method of processing user inputs with respect to a button-type element according to one embodiment.

FIG. 10 is a flow chart of a method of processing user inputs with respect to a scroll bar-type element according to one embodiment.

DETAILED DESCRIPTION

Figure 3:
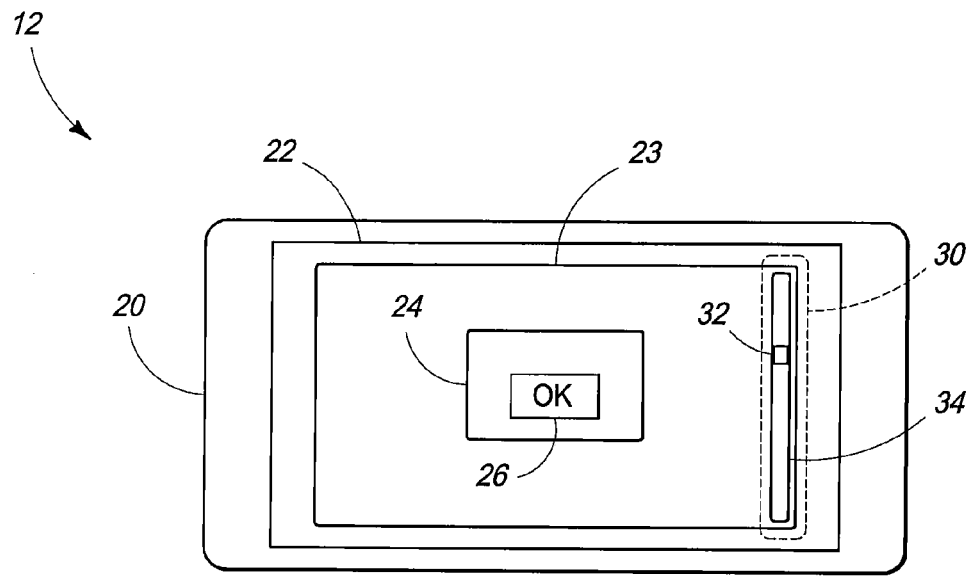
FIG. 3 is an illustrative representation of a user interface according to one embodiment.

At least some aspects of the disclosure pertain to processing of user inputs of an interactive display of a computing system. More specifically, a graphical user interface of the interactive display may include different types of user interface elements (e.g., buttons, scroll bars) which users may interact with in different ways. The user inputs are processed to determine whether the inputs control (e.g., activate and/or manipulate) one or more displayed user interface elements. As described in detail below in accordance with some embodiments of the disclosure, different processing methods are available to be used to process the user inputs and the different processing methods may be selected and used according to the respective types of user interface elements which are displayed when the user inputs are received. For example, a first processing method may be used to determine if a user input controls a first type of user interface element (e.g., button) and a second processing method may be used to determine if the user input controls a second type of user interface element (e.g., scroll bar). The use of different processing methods enables the methods to be tailored to process different types of user inputs in different ways in accordance with the types of user interface elements which are displayed and the types of user inputs (e.g., pressing a button or moving a scroll box) which are expected to be received if the user intended to control the displayed user interface elements. Additional details regarding the processing of user inputs using different processing methods are discussed below.

Referring to FIG. 1, a computing system 10 is illustrated according to one embodiment of the disclosure. The computing system 10 includes a user interface 12 which is configured to interact with one or more user. In one embodiment, the user interface 12 is implemented as a graphical user interface (GUI) which is configured to display visual images for observation by one or more users and to receive user inputs from one or more users. For example, user interface 12 may generate visual images which include user interface elements (e.g., buttons, scroll-bars, etc.) and users may control (e.g., activate and/or manipulate) the user interface elements by interacting with the user interface elements which are displayed. In FIG. 1, the example embodiment of the user interface 12 includes an interactive display 20 which depicts visual images including the graphical user interface and user interface elements and receives user inputs with respect to the user interface 12.

In one example embodiment, interactive display 20 is configured as a multi-touch interface which is configured to simultaneously process a plurality of user inputs resulting from user input objects (e.g., fingers, hands, stylus, paintbrush) which are provided adjacent to or contact the interactive display 20 at substantially the same moment in time in one example embodiment. One example of a computing system 10 with a multi-touch interactive display 20 is a Surface® computing system available from Microsoft Corporation. Other configurations of computing system 10 and user interface 12 are possible. Additional details regarding user interaction with computing system 10 using the user interface 12 are discussed further below.

Referring to FIG. 2, one example arrangement of components and circuitry of computing system 10 is shown according to one embodiment. The illustrated embodiment of computing system 10 includes user interface 12, processing circuitry 14, storage circuitry 16, and a communications interface 18. Other embodiments of computing system 10 are possible including more, less and/or alternative components. While one possible arrangement of computing system 10 is the Surface® computing system as mentioned above, computing device 12 may be provided in other arrangements in other embodiments where interaction with one or more users is implemented including, for example, desktop computers, notebook computers, portable devices (e.g., personal digital assistants, cellular telephones, media devices) or other computing arrangements.

As described above, user interface 12 is configured to interact with a user including conveying data to a user (e.g., displaying visual images for observation by the user) as well as receiving inputs from the user. User interface 12 may be configured differently in different embodiments.

In one embodiment, processing circuitry 14 is arranged to process data, control data access and storage, issue commands, and control other desired operations. In more specific examples, processing circuitry 14 processes information regarding user inputs received via user interface 12 and controls depiction of visual images which are created by user interface 12. As described further below, the processing circuitry 14 processes the information regarding the user inputs to determine whether the user inputs pertain to (e.g., activate and/or manipulate) one or more user interface elements which may be displayed using user interface 12.

Processing circuitry 14 may comprise circuitry configured to implement desired programming provided by appropriate computer-readable storage media in at least one embodiment. For example, the processing circuitry 14 may be implemented as one or more processor(s) and/or other structure configured to execute executable instructions including, for example, software and/or firmware instructions. Other exemplary embodiments of processing circuitry 14 include hardware logic, PGA, FPGA, ASIC, state machines, and/or other structures alone or in combination with one or more processor(s). These examples of processing circuitry 14 are for illustration and other configurations are possible.

Storage circuitry 16 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 16 and configured to control appropriate processing circuitry 14.

The computer-readable storage medium may be embodied in one or more articles of manufacture 17 which can contain, store, or maintain programming, data and/or digital information for use by or in connection with an instruction execution system including processing circuitry 14 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 18 is arranged to implement communications of computing system 10 with respect to external devices (not shown). For example, communications interface 18 may be arranged to communicate information bi-directionally with respect to computing system 10. Communications interface 18 may be implemented as a network interface card (NIC), serial or parallel connection, USB port, Firewire interface, flash memory interface, or any other suitable arrangement for implementing communications with respect to computing system 10.

Referring to FIG. 3, example interactions of a user with user interface 12 in the form of a multi-touch interactive display 20 in one embodiment are described. The illustrated interactive display 20 includes a display screen 22 which is configured to depict a plurality of visual images for observation by a user. The depicted example visual image of FIG. 3 includes a window 23 which includes a plurality of different types of user interface elements which users may interact with during interactive sessions with user interface 12 of computing system 10. More specifically, in the example of FIG. 3, two different types of user interface elements are shown including a button-type element 26 within a window 24 and a scroll bar-type element 30 which corresponds to content being displayed within window 23 in the illustrated example. Other types of user interface elements which users may view and interact with may be utilized.

Users interact differently with respect to the different types of user interface elements. For example, users may depress button-type element 26 by bringing a user input object approximate to or contacting a location of interactive display 20 where the button-type element 26 is displayed. Users may move a user input object upwardly or downwardly along an area of interactive display 20 which corresponds to the location of the scroll bar-type element 30 to move a scroll box 32 upwardly or downwardly within a bar region 34 of scroll bar-type element 30. These example interactions of the user may activate and manipulate the button-type element 26 or scroll bar-element 30.

Interactive display 20 receives user inputs of one or more users interacting with one or more of the displayed user interface elements 26, 30. In one embodiment, the user inputs are indicative of interaction of one or more user input objects with the user interface 12 and which may be processed by processing circuitry 14 to determine whether the user inputs control one or more of the displayed user interface elements in one embodiment. In one embodiment, one or more user input objects may interact with one or more different locations of display screen 22 at substantially the same moment in time to activate and/or manipulate one or more user interface elements displayed using display screen 22.

In one more specific embodiment, interactive display 20 may provide information regarding user inputs in the form of an image of user interaction (also referred to as a user input image) which defines a plurality of pixel locations of the display screen 22 which were activated (selected) by one or more user input object interacting with the user interface 12 at substantially the same moment in time. The activated pixel locations may correspond to one or more different regions of the display screen 22 corresponding to one or more user input objects interacting with the user interface 12 at the respective moment in time. In one operative embodiment of computing device 10, information in the form of a series of user input images may be generated at sequential moments in time by interactive display 20 to enable substantially continual monitoring by processing circuitry 14 of user interactions with respect to user interface 12 during operations of computing system 12.

Interactive display 20 may be embodied in any appropriate configuration to provide information regarding user inputs interacting with the user interface 12, for example, by bringing one or more user input objects approximate to or contacting different regions of display screen 22. In one example, interactive display 20 may include an infrared camera (not shown in FIG. 3 but which may be placed behind the display screen 22 in one embodiment) which captures user input images of interactions of user input objects with respect to the display screen 22 to provide the information regarding the user inputs. In another embodiment, infrared or capacitive sensors are embedded at pixel locations within the display screen 22 and are used to provide the information regarding user inputs. In yet another example, the display screen 22 may include an array of capacitive sensors arranged in grid across the surface of the display screen 22 and which is configured to provide information regarding user inputs. Any suitable configurations may be used to provide the information regarding user inputs in other embodiments.

In one embodiment, the user inputs received by the interactive display 20 may be processed by the processing circuitry 14 to determine whether the user inputs pertain to one or more displayed user interface elements. In one embodiment, the processing circuitry 14 identifies one or more regions of display screen 22 which were interacted with by the one or more user input objects. The identified regions may correspond to locations of the display screen 22 which were interacted with by user input objects in an illustrative example. In addition, processing circuitry 14 may use motion estimation processing techniques to estimate motion with respect to the display screen 22 between different images. In one more specific embodiment, the processing circuitry 14 may extract motion vectors across the surface of display screen 22 by calculating an optical flow field using a plurality of user input images and which includes vectors which are indicative of a pattern of motion of user inputs with respect to the display screen 22 between the user input images.

Processing circuitry 14 processes the information regarding the user inputs provided by interactive display 20 to determine whether the user inputs control one or more of the displayed user interface elements as described in detail below with respect to example embodiments of FIGS. 4 and 6. As mentioned previously, user interface 12 may display a plurality of user interface elements of different types. As described below, processing circuitry 14 may process user inputs differently with respect to the different types of user interface elements which are displayed.

In one embodiment, a plurality of different user input processing methods may be used to process the information regarding user inputs with respect to the user interface elements of different types. For example, the information may be processed with respect to button-type element 26 using a first user input processing method which corresponds to button-type elements and the user input may be processed with respect to scroll bar-type element 30 using a second user input processing method which corresponds to scroll bar-type elements.

In one embodiment, storage circuitry 16 may store information comprising a list of the user interface elements (and their respective types) which are displayed using the user interface 12. Processing circuitry 14 may access the information regarding the displayed user interface elements to ascertain the types and locations of the displayed user interface elements to process the information regarding the user inputs. The storage circuitry 16 may also store a plurality of different user input processing methods which are used by processing circuitry 14 to process the information regarding the user inputs for the different types of the user interface elements, respectively. The processing circuitry 14 may select and utilize appropriate different processing methods to process the information regarding user inputs with respect to the different types of user interface elements which are displayed by the user interface 12 at moments in time corresponding to the user interactions.

Figure 4:
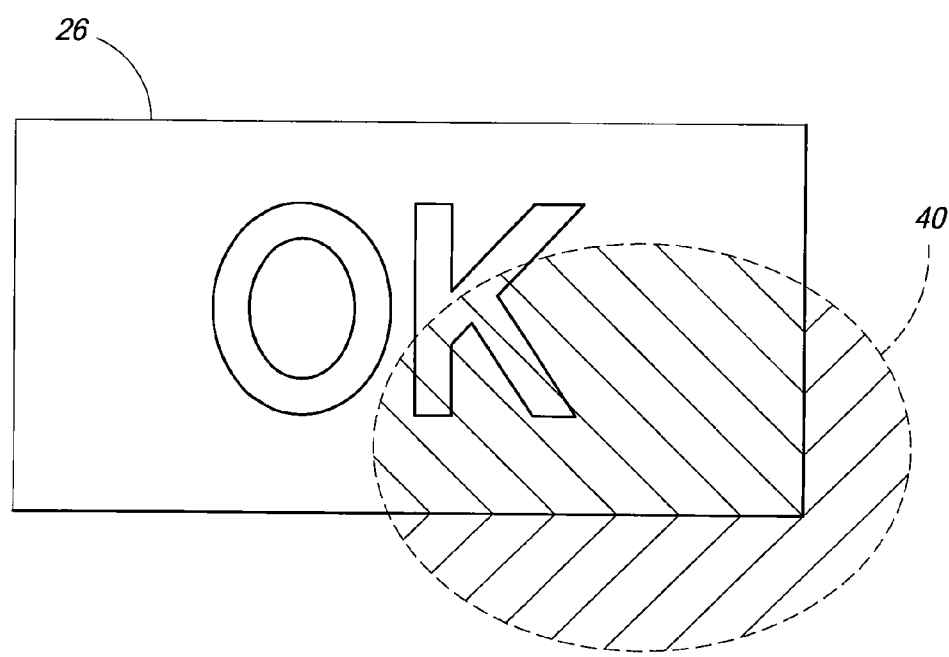
FIG. 4 is an illustrative representation of a region of user interaction with respect to a button-type element according to one embodiment.

Referring to FIG. 4, an exemplary user input processing method is described with respect to processing of information regarding user inputs with respect to a button-type element 26 according to one embodiment. Other methods may be used to process the information with respect to button-type elements in other embodiments.

FIG. 4 depicts the information regarding a user input in the form of a region 40 which corresponds to a region of pixels of interaction of a user input object (e.g., fingertip) with display screen 22. In one embodiment, region 40 is indicative of one user input object interacting with display screen 22. In one embodiment, the activated pixels of the region 40 may be provided within a user input image of the display screen 22 which also includes any other regions of pixels which were activated by other user input objects interacting with display screen 22 at substantially the same moment in time (if any).

As shown, one portion of the region 40 overlaps with an area of button-type element 26 defined by the geometric boundaries of the element while another portion of the region 40 is outside of the area of button-type object 26. In one embodiment, the processing circuitry 14 selects an appropriate user input processing method for processing the region 40 of the information regarding the user input with respect to the button-type element 26. In one example method of processing a user input with respect to button-type element 26, the processing circuitry 14 determines the number of pixels of the area of button-type element 26 which overlap with the region 40 of interaction by the user. In the described example, the processing circuitry 14 compares the resultant number of overlapping pixels of the area of button-type element 26 and region 40 with a threshold to determine if the user interaction pertains to the button-type element 26. An appropriate threshold may be empirically determined in one embodiment. Furthermore, a plurality of thresholds may be used in different processing embodiments. More specifically, a higher threshold may be used in one embodiment if it is desired to reduce the occurrence of false positive interaction determinations resulting from the processing, or a lower threshold may be used if it is desired to reduce the occurrence of false negative interaction determinations resulting from the processing.

If the number of activated pixels which overlap with the button-type element 26 exceeds the threshold, then the user interaction of region 40 is considered to control to the button-type element 26 and the processing circuitry 14 may change the button-type element 26. For example, the button-type element 26 may be activated from a non-activated state and manipulated (e.g., changed to a depressed state from a non-depressed state) as a result of the determination that the user input controls the button-type element 26. In addition, the activation and manipulation of the button-type element 26 may initiate additional processing by the processing circuitry 14 depending upon the application and functionality associated with the button-type element 26 (e.g., save a document, make a spell check change suggestion, etc.). In addition, the user inputs (e.g., the user input image) may also be processed (perhaps differently as described below) with respect to other user interface elements (e.g., scroll bar-type element 30) which are also displayed by display screen 22 at the moment in time when the information regarding the user input is ascertained.

If the overlapping number of pixels does not exceed the threshold, the user interaction is considered to not pertain to the button-type element 26 and the button-type element 26 is not changed (e.g., not activated nor manipulated). The information regarding the user input may also be processed with respect to other user interface elements which are also displayed as mentioned above.

In addition, some interactive displays 20 are configured to provide information of user input which includes different types of pixels for the user input. For example, for a contact resulting from a finger, the center of the contact region may be weighted an increased amount compared with outside portions of the contact, for example corresponding to the edges of the finger contact. This weighting may be first applied and a weighted sum of the activated pixels within the geometric boundaries of the button-type element 26 may be computed before comparison to the above-described threshold in one embodiment.

In some embodiments, the user input processing method may additionally process the information regarding user inputs in an attempt to reduce the occurrence of false activations of a user interface element. In one more specific embodiment, center-surround processing may be implemented. In one example, a number of pixels within the geometric boundaries of the button-type element 26 which are activated by a user input may be multiplied by a weighting (e.g., two) providing a first value which is indicative of the weighted pixels. A number of additional pixels activated by the user input which are located proximate the button-type element 26 but outside the geometric boundaries of element 26 (e.g., within a predetermined distance outside of the element 26) may be added to the number of activated pixels within the boundaries (which are unweighted) to provide a second value. The second value may be subtracted from the first value and the result of the subtraction may be compared to a threshold. If the result is greater than the threshold, then the user interaction may be deemed to control the button-type element 26 while the user interaction may not be deemed to control the button-type element 26 if the result is less than the threshold in one embodiment.

In another example technique for processing information regarding user inputs for a button-type element 26, an integral image technique is implemented which uses a summed area table of activated pixels to quickly and efficiently determine the number of pixels within the geometric boundaries of the button-type element 26. More specifically, the summed area table is calculated once and includes the activated pixels and their respective coordinates within the display screen 22. The summed area table may be thereafter be used to efficiently identify the number of activated pixels within the geometric boundaries of the button-type element 26.

Referring to FIG. 5, one example method of use of a summed area table to determine the number of activated pixels within the geometric boundaries of button-type interface 26 is described. Initially, a plurality of rectangles 44-47 may be determined from the origin (e.g., lower left corner in the described example) with respect to the button-type interface 26 and values for the respective rectangles may be determined using the summed area table and which indicate the numbers of activated pixels present within the respective rectangles 44-47. Thereafter, the values for rectangles 45 and 46 may be subtracted from the value of rectangle 44. Furthermore, the value of rectangle 47 may be added to the result of the subtraction of rectangles 45, 46 from rectangle 44 to provide the number of activated pixels present within the geometric boundaries of button-type element 26 and which may thereafter be used to determine whether the user input controls button-type element 26.

Referring to FIG. 6, an exemplary user input processing method is described with respect to scroll bar-type element 30 according to one embodiment. Other methods may be used to process scroll bar-type elements 30 in other embodiments. Furthermore, the user input processing method used by processing circuitry 14 to process the user input with respect to the scroll bar-type element 30 is different than the user input processing method described above to process the information with respect to button-type elements 26 as is apparent from the following discussion.

As mentioned previously, the processing circuitry 14 may be able to ascertain one or more motion vectors of user interactions from user inputs received by interactive display 20. In FIG. 6, one example of a plurality of motion vectors 42 determined from the information regarding user inputs is illustrated. In one embodiment, processing circuitry 14 selects one of a plurality of different user input processing methods pertinent to scroll bar-type element 30 to process user inputs. According to one example processing method, processing circuitry 14 may analyze the motion vectors 42 with respect to the scroll bar-type element 30 to determine whether the user interactions pertain to the scroll bar-type element 30. In the depicted example, the scroll box 32 is configured to move either upwardly or downwardly in a vertical direction in the bar region 34. In one processing embodiment, processing circuitry 14 may process motion vectors 42, which are either overlapping with or within a specified distance of scroll bar-type element 30, with respect to the scroll bar-type element 30 to determine whether the user input controls the scroll bar-type element 30.

If the direction of the motion vectors 42 is aligned with possible directions of movement of scroll box 32 (i.e., upwardly or downwardly in the illustrated embodiment) within a specified tolerance, then the processing circuitry 14 may determine that the user input controls the scroll bar-type element 30 and may change the scroll bar-type element 30. In one example, an angle of tolerance may be specified and the user input may be deemed to control the scroll bar-type element 30 if the angle between a possible direction of movement of scroll box 32 and the direction of the motion vectors 42 is less than the angle of tolerance. Different angles of tolerance may be used (e.g., 5-45 degrees) in different embodiments depending upon how accurate the user input is desired to be with respect to the scroll bar-type element 30 before the user input is deemed to control the scroll bar-type element 30.

For example, the scroll box 32 may be activated from a non-activated state and manipulated (e.g., moved upwardly corresponding to the direction of the motion vectors 42) as a result of the determination that the user input pertains to the scroll bar-type element 30. Usage of motion vectors 42 described herein in one example allows processing of input with respect to some user interface elements without tracking discrete objects of user interaction.

The activation and manipulation of the scroll bar-type element 30 may initiate additional processing by the processing circuitry 14 depending upon the application and functionality associated with the scroll bar-type element 30 (e.g., move the contents which are displayed in window 23 corresponding to the movement of the scroll box 32 of the scroll bar-type element 30, etc.).

If the pertinent motion vectors 42 (e.g., the motion vectors which overlap with or are sufficiently proximate to the scroll bar-type element 30) are not sufficiently aligned with the possible directions of movement of the scroll box 32, the user interaction is considered to not pertain to the scroll bar-type element 30 and the scroll box 32 is not changed (e.g., not activated nor manipulated) in one embodiment.

The information regarding the user inputs may also be processed with respect to other user interface elements which may also be displayed concurrently with the button-type element 26 and scroll bar-type element 30 in one embodiment.

As mentioned above, different types of user input objects may interact with user interface 12. Referring to FIG. 7, an example of a user interacting with a painting application is described. An example window 50 which may be displayed by user interface 12 includes a plurality of user interface elements in the form of paint container-type elements 52*a*, 52*b*, 52*c* which are different colors in the illustrated embodiment. Computing system 12 may use information regarding the painting application and paint container-type elements 52*a*, 52*b*, 52*c* to process user inputs with respect to window 50 in one embodiment. The user may use a user input object in the form of a physical paint brush 54 to interact with window 50 of user interface 12 in one embodiment. In one embodiment, processing circuitry 14 may use object recognition techniques to process the information regarding user input to identify the type of user input object interacting with the user interface 12 in one embodiment. In the example embodiment of FIG. 7, the processing circuitry 14 may use object recognition to determine whether the user input object interacting with window 50 is a paint brush user input object as may be expected given that window 50 is associated with a painting application. If the user input object interacting with window 50 is determined to be a paint brush, then a user input processing method configured to analyze interactions of paint brush 54 may be selected and utilized to process the information regarding the user inputs with respect to paint container-type elements 52*a*, 52*b*, 52*c*. In one embodiment, the selected user input processing method is tailored to process inputs corresponding to strokes of the paint brush 54 over the user interface 12. Computing system 10 may be configured to recognize different types of user input objects and process user inputs from different types of user input objects in other embodiments.

Referring to FIG. 8, one method of processing user interactions with respect to a user interface is described according to one embodiment. Other methods are possible including more, less and/or alternative acts. The method may be implemented by processing circuitry 14 in one embodiment.

At an act A12, user input information indicative of user inputs of one or more user input objects with the user interface is accessed.

At an act A14, a list of user interface elements is accessed which includes the elements which were displayed by the interactive display when the user input was received.

At an act A16, the user input information may be processed differently with respect to different types of the user interface elements. In one embodiment, a plurality of different user input processing methods are selected which correspond to the types of user interface elements being displayed as indicated by the accessed list of act A14.

At an act A18, the user input information is processed for each of the user interface elements using respective ones of the selected user input processing methods which correspond to the respective types of the displayed user interface elements. The processing determines whether the user inputs pertain to the user interface elements for activation and/or manipulation of the user interface elements.

At an act A20, the user interface elements which were determined to be activated and/or manipulated by the user inputs are changed in accordance with the user inputs.

At an act A22, additional processing is performed (if any) as a result of the user interacting with one or more of the user interface elements.

Referring to FIG. 9, one method of processing user interactions with respect to a button-type element is described according to one embodiment. Other methods are possible including more, less and/or alternative acts. The method may be implemented by processing circuitry 14 in one embodiment.

At an act A30, user input information regarding one or more regions of the display interacted with by one or more user input objects is accessed.

At an act A32, information regarding a displayed button-type element is accessed. For example, the information may define the location and geometric boundaries of the button-type element of the display.

At an act A34, regions of the user input information which overlap with the button-type element are identified. In one embodiment, the overlapping regions may be expressed as a number of pixels of the regions of user input which overlap with the button-type element.

At an act A36, the overlapping portion(s) of the user interaction regions and the button-type element are compared with a threshold. In one example, a number of overlapping pixels identified in act A34 is compared with a threshold number of pixels.

If the condition of act A36 is affirmative, the button-type element may be activated and/or manipulated according to the user input at an act A38.

The user input information may be disregarded with respect to the button-type element if the condition of act A36 is negative.

Referring to FIG. 10, one method of processing user interactions with respect to a scroll bar-type element is described according to one embodiment. Other methods are possible including more, less and/or alternative acts. The method may be implemented by processing circuitry 14 in one embodiment.

At an act A40, motion vectors of the user input information is accessed.

At an act A42, information regarding a displayed scroll bar-type element is accessed. For example, the information may define the location and area of the scroll bar-type element of the display as well as control directions of movement of the scroll box.

At an act A44, it is determined whether the motion vectors in the vicinity of the scroll bar-type element are sufficiently aligned within an acceptable tolerance with possible control directions of the scroll box.

If the condition of act A44 is affirmative, the scroll bar-type element may be activated and/or manipulated according to the user input at an act A46.

The user input information may be disregarded with respect to the scroll bar-type element if the condition of act A44 is negative.

At least some aspects described above provide improvements over some conventional user interaction processing methods. For example, some conventional user interaction processing techniques implement hit-testing calculations where a finger contact is reduced to a point, such as a centroid of the finger contact, and the coordinates of the point are compared against onscreen objects. However, this process disregards much of the information regarding the finger contact, such as size and shape. The reduction of the contact to a point presumes a precision of the coordinates which is not supported by the sensed data which can lead to a breakdown in the interaction if the computed point does not agree with the user's own notion of the point of interaction (if the user has one). In but one example, a button-type element may not be depressed in the conventional arrangement even when part of the contact overlaps with the button-type element but a calculated centroid lies outside of the button-type element.

At least some aspects of the disclosure utilize an increased amount of the sensed information of user inputs interacting with the user interface compared with the above-described conventional arrangement. The information of the user inputs may be examined with regards to the displayed types of user interface elements and the information may be processed differently using different processing methods specific to the different types of user interface elements. Some of the described aspects reduce breakdowns in interaction which may otherwise occur with an incorrect assumption that a contact may be modeled as a point. The processing of interactions with respect to user interface elements as described in the present disclosure is believed to be more robust and accurate with respect to the user's intentions compared with the above-described conventional method where user interactive contacts are reduced to points since the processing of the information of the user inputs may be tailored to individual user interface elements while also using an increased amount of information regarding user inputs provided by the user interface compared with distilled information regarding individual points of contact.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A user interaction method implemented by a system comprising:

receiving a user input image via a graphical user interface displayed on a display screen, wherein the graphical user interface includes a plurality of user interface elements, the user input image defining a plurality of pixel locations of the display screen, the plurality of pixel locations activated by one or more input objects interacting with the graphical user interface, the plurality of activated pixel locations defining one or more regions of activated pixel locations of the display screen; and processing the user input image to determine whether the user input image controls at least one user interface element displayed in the graphical user interface, the processing including:

identifying a number of first pixels activated by the user input image and which are within an area defined by a geometric boundary of the user interface element, weighting the number of first pixels to provide a first value, identifying a number of second pixels which are proximate to the user interface element but outside the geometric boundary of the user interface element, combining the number of first pixels without the weighting and the number of second pixels to provide a second value, subtracting the second value from the first value to provide a third value, and comparing the third value with a threshold to determine whether the user input image controls the user interface element.

2. The method of claim 1, wherein the receiving comprises receiving the user input image resulting from a plurality of user input objects interacting with the graphical user interface at substantially the same moment in time.

3. The method of claim 1 further comprising processing the user input image to identify at least one of a plurality of different types of user input objects which interacted with the graphical user interface to create the user input image.

4. The method of claim 1, wherein the processing comprises determining a first region comprising a plurality of pixels of the graphical user interface selected by the user input and comparing the first region with the at least one user interface element displayed in the graphical user interface.

5. The method of claim 1, wherein the at least one user interface element comprises a first user interface element and a second user interface element in the graphical user interface, wherein the second user interface element is different from the first user interface element, and wherein a first input processing method corresponds to the first user interface element and a second input processing method corresponds to the second user interface element.

6. The method of claim 1 further comprising changing the at least one user interface element as a result of the processing determining that the user input image controls the at least one user interface elements which is displayed in the graphical user interface.

7. The method of claim 1, wherein the at least one user interface element is a button-type element, and wherein the processing comprises:

identifying a number of first pixels activated by the user input image and which are within an area defined by a geometric boundary of the button-type element;

weighting the number of first pixels to provide a first value;

identifying a number of second pixels which are proximate to the button-type element but outside the geometric boundary of the button-type element;

combining the number of first pixels without the weighting and the number of second pixels to provide a second value;

subtracting the second value from the first value to provide a third value; and comparing the third value with a threshold to determine whether the user input image controls the button-type element.

8. The method of claim 5, wherein a second user interface element is a scroll bar-type element, and wherein the processing comprises identifying a motion vector of the user input image and comparing the motion vector with respect to the scroll bar-type element to determine whether the user input image controls the scroll bar-type element.

9. The method of claim 5, wherein the first user interface element is a button-type element, and wherein the processing comprises identifying a number of pixels activated by the user input image and which are within an area corresponding to the button-type element and comparing the number of pixels with respect to a threshold to determine whether the user input image controls the button-type element.

10. The method of claim 1, wherein each of the plurality of user interface elements corresponds to a type of a user interface element, and the method further comprising accessing information regarding the type of the at least one user interface element displayed in the graphical user interface.

11. A system comprising:

processing circuitry;

at least one computer-readable storage medium comprising programming stored thereon that is configured to cause the processing circuitry to perform processing comprising:

first processing a user input image received by a graphical user interface using a first user input processing method which corresponds to a first type of user interface element, the first processing including:

identifying a number of first pixels activated by the user input image and which are within an area defined by a geometric boundary of the user interface element, weighting the number of first pixels to provide a first value, identifying a number of second pixels which are proximate to the user interface element but outside the geometric boundary of the user interface element, combining the number of first pixels without the weighting and the number of second pixels to provide a second value, subtracting the second value from the first value to provide a third value, and comparing the third value with a threshold to determine whether the user input image controls the user interface element;

second processing the user input image using a second user input processing method which is different than the first user input processing method and which corresponds to a second type of user interface element, the second type different from the first type;

using the first processing, determining whether the user input image controls one of the user interface elements that is displayed on the display screen, which is the first type of user interface element; and using the second processing, determining whether the user input image controls another user interface element that is displayed on the display screen which is the second type of user interface element.

12. The system of claim 11, wherein the programming is configured to cause the processing circuitry to perform processing that further comprises receiving the user input image resulting from a plurality of user input objects interacting with the graphical user interface at substantially the same moment in time.

13. The system of claim 11, wherein the programming is configured to cause the processing circuitry to perform processing that further comprises processing the user input image to identify at least one of a plurality of different types of user input objects interacting with the graphical user interface.

14. The system of claim 11, wherein the first processing comprises determining a region of a plurality of pixels of the graphical user interface selected by the user input image and comparing the region with the one of the user interface elements.

15. The system of claim 11, wherein the programming is configured to cause the processing circuitry to perform processing that further comprises accessing information regarding any user interface elements displayed in the graphical user interface, and further comprising selecting the first and second user input processing methods using the information.

16. A system comprising:
processing circuitry coupled with an interactive display, wherein the processing circuitry is configured to access information regarding one of a plurality of types of user interface elements which is displayed in the graphical user interface, to access the user input image, to select one of a plurality of different user input processing methods which corresponds to the one of the plurality of types of user interface elements using the information regarding the one of the plurality of types of user interface elements, the user input processing methods being different for each different type of user interface element, and to process the user input image using the selected one of the user input processing methods to determine if the user input image controls the one of the user interface elements which is displayed in the graphical user interface, the processing including:
identifying a number of first pixels activated by the user input image and which are within an area defined by a geometric boundary of the user interface element, weighting the number of first pixels to provide a first value,
identifying a number of second pixels which are proximate to the user interface element but outside the geometric boundary of the user interface element,
combining the number of first pixels without the weighting and the number of second pixels to provide a second value,
subtracting the second value from the first value to provide a third value, and
comparing the third value with a threshold to determine whether the user input image controls the user interface element.

17. The system of claim 16, wherein the interactive display comprises a multi-touch interface which is configured to receive the user input image resulting from a plurality of user input objects interacting with the multi-touch interface at substantially the same moment in time.

18. The system of claim 16 wherein the user interface element of the graphical user interface comprises a first user interface element, wherein the graphical user interface includes a second user interface element which is another of the plurality of types of user interface elements.

19. The system of claim 16, wherein the user interface element is a button-type element and wherein the interactive display is a multi-touch interface configured to receive the user input image resulting from a plurality of user input objects interacting with the multi-touch interface at substantially the same moment in time, and wherein the processing circuitry is configured to select one of a plurality of different user input processing methods which corresponds to the button-type element, to process the user input image using the one of the user input processing methods including identifying a region of pixels activated by one of the user input objects interacting with the multi-touch interface and which region overlaps with an area of the button-type element and comparing the region of pixels with a threshold to determine if the user input controls the button-type element, and to change the button-type element if it is determined that the user input image controls the button-type element.

20. The system of claim 16, wherein the processing circuitry is configured to access information regarding a type of one of the plurality of types of user interface elements which is displayed in the graphical user interface.

* * * * *